July 21, 1953  A. MARCHAND  2,646,334
TIME RECORDING DEVICE
Filed June 5, 1950
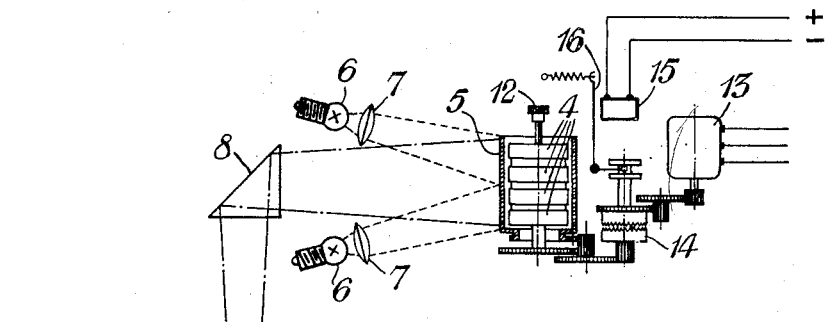
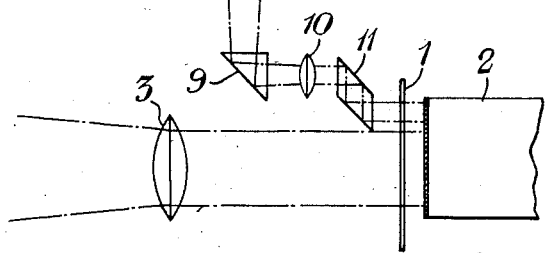
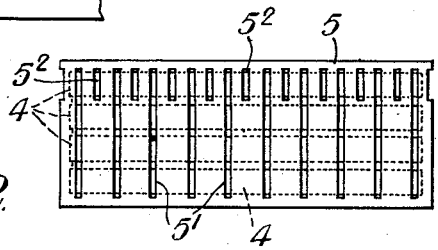
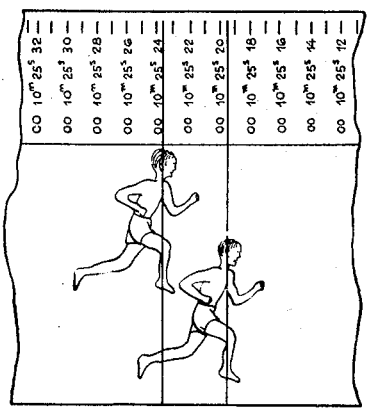
Inventor:
André Marchand;
By his attorneys,
Baldwin, Wight, & Prevost Patented July 21, 1953

2,646,334

UNITED STATES PATENT OFFICE 2,646,334

TIME RECORDING DEVICE

André Marchand, Bern, Switzerland, assignor to The Race Finish Recording Company Limited, London, England Application June 5, 1950, Serial No. 166,231
In Switzerland June 10, 1949

2 Claims. (Cl. 346—107)

This invention relates to a time recording device: the invention is concerned with the photographic recording of movements and while it is mainly for use in recording sporting events such as races and so on it is capable of general application: in what follows, terms such as "the finishing line" appropriate to sporting events will be used for convenience although it is to be understood that the invention is not limited to such use.

The task of the judge in such is often difficult and at times is almost impossible as the contestants generally reach the finishing post in rapid succession. It is known to employ for such events cinematographic apparatus and it has been suggested that an optical device should be incorporated in the camera in such a way that the image of a watch will be reproduced on the film, so making it possible to read the exact time taken.

The invention however is concerned more especially with that type of recording device in which a camera causes a film to be advanced continuously at a speed corresponding to the speed at which the images of the contestants are projected onto the film so that their images will be sharp in spite of their movement, the field of the camera being restricted by a slit aperture to a narrow band covering the finishing line.

The main object of the present invention is to provide improved apparatus by which it is possible to time events with great accuracy.

This invention consists in providing in combination with such a camera a rotary drum or disc type of counter which is subjected to a continuous source of illumination but the time markings of which are exposed to the illumination only at predetermined intervals by a rotatable cylindrical mask which surrounds the elements of the counter and which has in its periphery a series of openings which expose the markings on the elements to the illumination at regular intervals: the images of the exposed markings are projected by an optical device on to the film level with the images of the contestants and following one another in continuous succession along the film.

In order to ensure that the numerals are exposed at definite regular intervals, the counter and the mask are positively connected together by gearing so that they rotate in synchronism and thus prevent the change-over of the markings from getting out of step with their exposure to illumination.

The accompanying drawings show by way of example an embodiment of the device according to the invention.

Figure 1 is a diagrammatic view of the device, while Figure 2 shows a part of the developed film which is produced by the apparatus shown in Figure 1 and Figure 2 is a detail view.

Referring to the drawings, a camera of the continuously moving film type already referred to includes a screen 1 with adjustable slot which when the apparatus is in use is trained on to the finishing line of a race-course. This screen 1 is located between the film 2 which is (in use) continuously advanced at the same or substantially the same speed as the image which will be projected on to it by the optical system 3 of the camera. The slot in the screen 1 is somewhat wider towards the top so that the beam of light projecting the figures of a counter may pass therethrough, as will be explained. Incorporated in this apparatus is a counter which consists of a series of four drums 4 such as are well known to be used in the construction of totalizers. The drums 4 bear figures indicating hours, minutes, seconds and hundredths of a second respectively. Each of them rotates at such a speed that the exact time may be read continuously on a tangent parallel to the common axis of the drums. The first drum is driven continuously and the other drums are advanced intermittently from the first in the manner which is well known.

The drums 4 are surrounded by a thin cylindrical casing or mask 5 which rotates around them at the rate of five revolutions a second. A lamp system 6 in connection with condensors 7 projects on the casing 5 a strong and continuous light beam. The mask 5 shields the drums 4 from illumination by the lamp system 6 except for intermittent illumination at regular intervals governed by rotation of the mask 5; because the mask is in the form of a hollow cylinder it is possible to provide a number of slots 5' which enable the drums to be exposed to illumination at very short intervals; thus this mask can be formed as is shown in the developed form in Figure 3 with ten longitudinal slots 5' uniformly spaced on its periphery: through these slots it is possible to observe the figures of the drums 4 corresponding to all the even hundredths of a second. A second series of shorter slots is interspersed as shown at 5² between the slots of the first series and shows only lines corresponding to the odd hundredths of a second.

The casing 5 is varnished with matt black while the drums 4 are coated with a white colouring matter, the figures being engraved in black.

It will be understood that each hundredth of a second one of the long slots or one of the small slots uncovers in the light field either the complete set of the figures or a line corresponding to an odd hundredth of a second, and an image of these figures or line is projected on the film 2 by the optical device 8 to 11 each time they pass in front of one of the slots.

The width of the slots and their speed of rotation are combined in such a manner that each figure is visible for a period of $\frac{1}{750}$ second. This very short time of exposure permits the projection of a sharp image on the film, the speed of which is relatively slow.

The counter 4, 5 may have its figures reset to zero before a race by means of the knob 12. The counter 4 and mask 5 are both driven by a motor 13 and fixed ratio positive drive means such as the gearing shown in Figure 1. The speed of the motor is exactly controlled by a quartz electron device (not shown). A clutch 14 inserted between the motor 13 and the counter 4, 5 permits the counter to be started either at will or automatically and for this purpose an electric device including a magnet 15 and an armature 16 can be provided to permit of a remote control of the clutch 14.

The operation of the time recording device is as follows:

The device is firmly secured with the slot in the screen 1 aligned with the finishing line.

The motor 13 is started shortly before the start of the race, the clutch control 15, 16 having previously been electrically connected to a signalling apparatus at the starting-post, e. g. to the starting pistol or the like.

The starting signal causes the counter 4, 5 to be coupled with the motor 13 so that the counter begins running from the zero setting. From that moment, at each hundredth of a second, images of the figures indicating the time which has elapsed since the start or of the lines for the odd hundredths of a second, are projected on the film 2.

Shortly before the arrival of the contestants the film 2 has to be put in motion. The speed of film movement should be adjusted proportionally to that of the contestants so that their images projected by the optical system 8 to 10 move at the same rate as the film itself. From that moment the figures giving the time which has elapsed since the start are registered on the film strip facing the slot of the screen 1 and as the device has been directed exactly on the finishing line, images of the contestants are also formed on the film as they arrive on the said line.

Once the finish has been completed it is necessary to develop only the used part of the film by any of the well-known methods for rapid development and then to draw on the film a transverse line on the film registered to some given point on each contestant e. g. in the case of runner registered, the chest of each runner in accordance with international rules, or, in the case of a horse race, the muzzle should be selected. The exact time taken by a contestant can now be read on the side of the film (see Fig. 2).

What I claim is:

1. A time-recording device comprising a camera having means to move a film continuously, an optical projection system including a slit aperture component projecting uninterruptedly on to the film as it is moving, a rotatable multi-element disc counter having time-notation markings, a constantly acting source of illumination, a hollow cylindrical mask shrouding the counter elements from the source of illumination, the mask having a series of exposure openings regularly spaced about its periphery, a single electric motor to rotate continuously the first element of the counter and the mask to cause the time notation markings on the counter elements to be intermittently illuminated, fixed ratio drive means to connect the said first element, the counter, and the mask positively for rotation in unison whereby the time notation markings are intermittently illuminated at regular intervals through the successive exposure openings, and an optical system to project the intermittently illuminated markings of the counter elements on to the film.

2. A time-recording device comprising a camera, means to move a photographic film continuously, an optical projection system including a slit aperture component projecting continuously on to the film, a rotatable multi-element counter having time-notation indications, a constantly acting source of illumination, a rotatable cylindrical mask surrounding the counter device and being thereby interposed between the source of illumination and the counter device, the said mask having a series of exposure openings spaced about its periphery, a single drive means to rotate the first element of the counter and the mask continuously, fixed ratio drive means positively connecting the mask and the said first element of the counter for rotation in unison whereby the time-notation markings are successively exposed through successive exposure openings at regular time intervals to the source of illumination for projection on the film, certain of said openings being of a length to register simultaneously with and effect exposure of the time-notation markings on a plurality of elements of said counter, and other of said openings being interspersed between said certain of said openings and being of a length to register with and effect exposure of less than said plurality of said counter elements, and an electrically operable device to initiate the operation of the driving means.

ANDRÉ MARCHAND.

References Cited in the file of this patent

UNITED STATES PATENTS

| Number | Name | Date |
| --- | --- | --- |
| 2,257,100 | Belock | Sept. 30, 1941 |
| 2,403,911 | Crowley | July 16, 1946 |
| 2,430,975 | Crowley | Nov. 18, 1947 |

FOREIGN PATENTS

| Number | Country | Date |
| --- | --- | --- |
| 515,261 | Germany | Nov. 7, 1928 |